Figure 1:
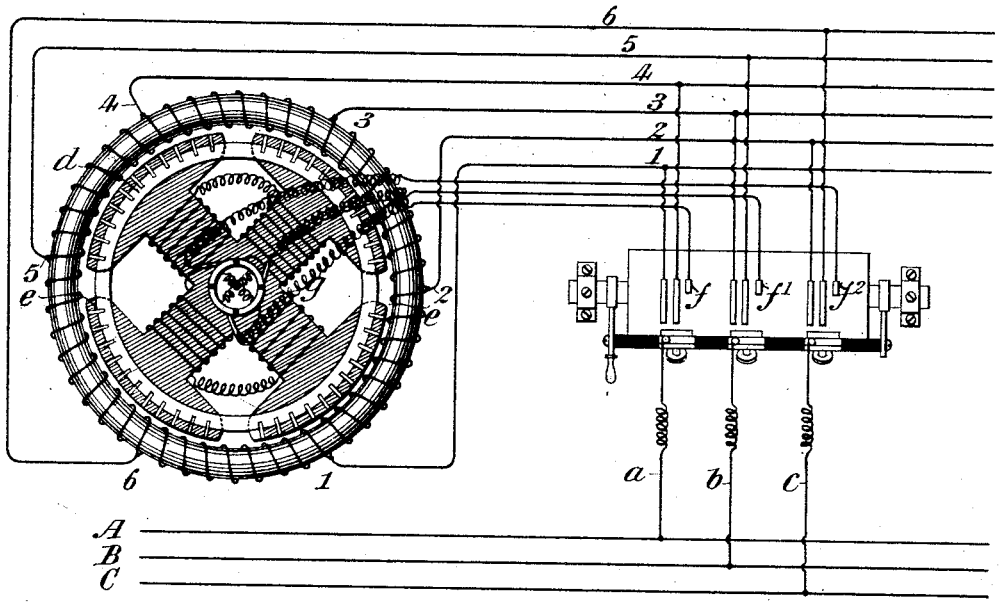

(No Model.)

C. S. BRADLEY.
ALTERNATING CURRENT MOTOR.

No. 514,904. Patented Feb. 20, 1894.

Witnesses
C. E. Ashley
John P. Nordstrom

Inventor
Chas. S. Bradley
By his Attorneys
Read & Price

UNITED STATES PATENT OFFICE.

CHARLES S. BRADLEY, OF AVON, NEW YORK.

ALTERNATING-CURRENT MOTOR.

SPECIFICATION forming part of Letters Patent No. 514,904, dated February 20, 1894.

Application filed January 14, 1893. Serial No. 458,368. (No model.)

*To all whom it may concern:*

Be it known that I, CHARLES S. BRADLEY, a citizen of the United States, residing at Avon, in the county of Livingston and State of New York, have invented certain new and useful Improvements in Alternating-Current Motors; and I do hereby declare the following to be a full, clear, and exact description of the invention, such as will enable others skilled in the art to which it appertains to make and use the same.

This invention relates to alternating current electric motors, the object being to realize the high efficiency of a synchronously operating motor, and to provide in the same machine a winding by which the motor may be brought up to a synchronous speed. It is well understood that the efficiency of alternating current motors when operating in synchronism with the alternations of current, that is to say, when in the revolution of the rotary element a change from pole to pole occurs in the same time as a half period of the alternating current, is very high; a difficulty, however, which has limited the application of this class of motors resides in the fact that they are difficult to start because they will not operate at all unless when at synchronism, and where used heretofore auxiliary motors have generally been utilized to start them and bring them up to a synchronous speed, when they are made active by an automatic or hand-controlled switch; another difficulty is that under a great change of load they are liable to be thrown out of synchronism and their torque destroyed, and they gradually slow down and come to a state of rest. It is the aim of my invention to overcome these difficulties. I proceed by combining in the same motor a rotary magnetic field created by two or more alternating currents differing in phase, and placing in operative relation thereto an armature provided with two circuits, one of which may be inductively acted upon by the field so as to form a self-starting motor, and the other of which may be thrown into operation by a switch when the motor attains a synchronous speed, or a speed above synchronism. In such a motor the slip of the armature with reference to the rotary field when the motor is started creates a strong induction in the closed armature circuit and produces a degree of magnetization which gives the motor a strong torque. This slip grows less and less as the armature rises in speed, and when the latter attains synchronism the slip is zero, that is to say, the armature is dragged around at the same speed as the rotary field. At such times no lines of force are cut by the closed inductive winding on the armature, and consequently no polarizing effect is developed and the torque is weak. It is possible by providing the armature with an auxiliary winding which may be cut into circuit when the motor attains synchronism to have such winding develop fixed poles in the armature when synchronism is attained, and the motor will then operate with the high efficiency common to synchronous motors.

My invention therefore comprises an alternating current motor provided with means for developing a rotary magnetic field and having an armature provided with two circuits, one adapted to co-operate inductively with said field, thus making the motor self-starting, and the other adapted to carry the current from the source of supply at or above synchronism and develop in the armature a set of fixed poles.

The several features of novelty of the invention will be more particularly hereinafter described and definitely indicated in the claims appended to this specification.

Figure 2:
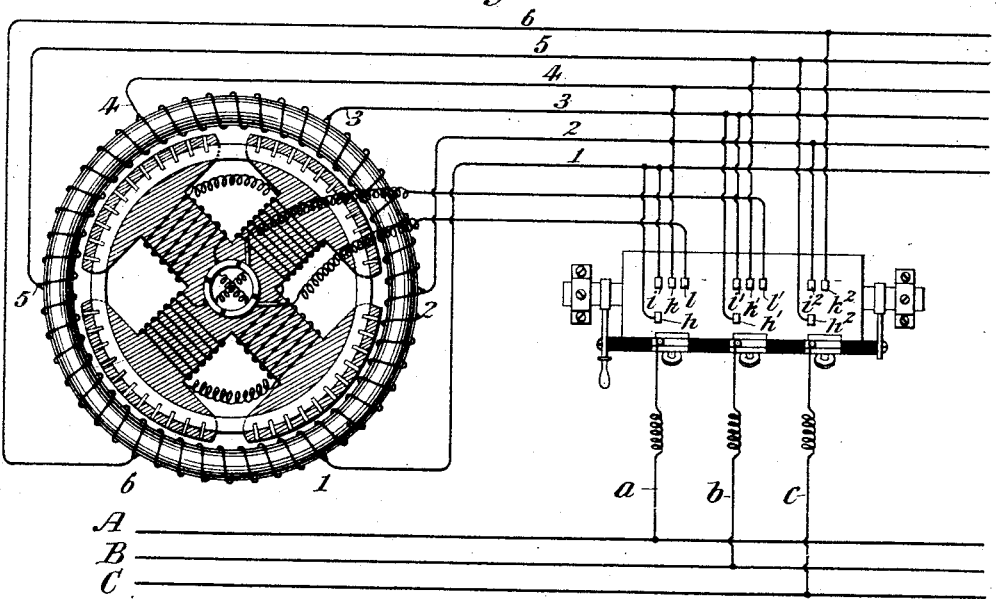

In the accompanying drawings which illustrate the invention, Figure 1 is a diagrammatic view of one form of the invention, in which the motor is started through the action of the inductive circuit on the armature and brought up to synchronism, after which the synchronous armature winding is cut into circuit, and the machine operates then as a synchronous motor. Fig. 2 is a similar view of a modified form of the invention, in which the motor is raised by the inductive winding to a speed above synchronism, after which a switch is thrown to reduce its speed, and cuts into circuit the synchronous winding so that the armature will slow down and gradually fall into synchronism.

In both cases I have shown the invention as applied to a triphase circuit, the three mains of such circuit being indicated at A, B, C. It will of course be understood that the invention may be applied to a polyphase alternating circuit of any degree, or even to a simple alternating current circuit when means are used at the motor to develop currents of differential phase capable of producing a rotary magnetic field. As many methods of producing such differences of phase are now understood in the art it will be unnecessary to describe them herein.

From the supply circuit three connections, $a, b, c$, are carried to a switch provided with three brushes or wipers adapted to engage a series of fixed contacts, connected with the motor in such a way that a definite number of poles may be developed in the rotary magnetic field.

In Fig. 1 the organization is shown as adapted to produce four poles. The switch is thrown so that the brushes bear upon the lower ends of the long contacts, which develops four poles in the rotary field as follows: We will assume that at a given instant the current is circulating over the mains in such a way that it will enter by the wire $a$ and return by the wires $b, c$. Under these circumstances, when the brushes are thrown upon the long contacts, current will enter the winding of the rotary field at the points 1 and 4, returning from the former by wires 2 and 6 to the wire $c$, and from the latter by wires 3 and 5 to the wire $b$, thus developing four poles in the iron ring constituting the magnetic circuit of the rotary field. This ring should be composed of laminated iron as should also the armature core. The latter is provided with a double I armature provided with four polar projections in which are set at intervals German silver bars $e$, the bars being placed in longitudinal grooves formed in the armature core and connected at each end by an annular conductive head $d$. Upon the armature shaft is mounted a four-part commutator $g$, opposite quadrants being cross-connected as indicated, upon which commutator bear three brushes set at angular distances of one hundred and twenty degrees. The cross-connected pairs of quadrants are electrically connected with the terminals of a polarizing circuit wound about the legs of the armature in such a way as to develop opposite poles in adjacent armature poles. Under these circumstances when the wires $a, b, c$ are thrown by the switch into connection with the lower ends of the long contacts a four-pole rotary field is developed in the ring core which acts inductively upon the German silver bars which at all times form a closed circuit, and by reason of the lag of the armature in speed behind the poles of the field strong induction is created in the circuit formed by the set of bars, and the armature is polarized so as to form a four-pole system which will co-operate with the rotary poles of the field and gradually bring the armature up to a speed which will be synchronous with the speed of the field poles. When this speed is attained the switch is thrown farther so as to engage the series of contacts, $f, f', f^2$, connected with the three brushes bearing upon the four-part commutator of the armature. The armature now rotating at synchronism commutates the current in such a way that the armature poles are maintained at a constant polarity, and the torque of the inductive system which fell to a very low point when synchronism was attained is now raised to a high point by the co-operation of the fixed and constant armature poles with the poles of the rotary field. In the modification shown in Fig. 2, in starting the motor two poles are developed by leading the current through the contacts $h, h', h^2$ to the points 1, 3 and 5 of the ring winding, thus developing two poles in the rotary field which will have a speed of rotation considerably in excess of the synchronism at which the four-pole armature will prove most effective. When the motor attains this high speed the switch is further thrown and the two-pole system is converted into a four-pole system by means of the contacts $i, k, i', k', i^2, k^2$, and at the same time two of the wires, as $a, b$, are connected by means of auxiliary contacts $l, l'$ with two brushes bearing upon the four-part commutator which redirects the current for the synchronous armature winding. In this case the rotary field after being shifted from the contacts $h$ to the contacts $i$ falls in speed from that incident to a two-pole system, down to that incident to a four-pole system, and when the armature falls into synchronism with the latter the synchronous circuit becomes operative, and the motor then operates as a synchronous motor. If at any time the motor in either case should be overloaded and the armature should fall out of synchronism the inductive circuit, by reason of the slip, will become active and will bring the motor into synchronism when the load is removed, or the synchronous circuit may be switched out of action and the motor restarted in the manner already described. I have shown as a winding for developing the rotary magnetic field a simple closed coil winding tapped at certain points. It will, however, be understood that any of the well known forms of winding adapted to develop a rotary field may be used. The resistance of the inductive system formed by the bars $e$ and the rings $d$ should be such that maximum torque will be afforded. If of too low resistance the degree of magnetization produced upon the armature will be so great that its poles will overpower those of the rotary field.

Having thus described my invention, what I claim as new, and desire to secure by Letters Patent, is—

1. An alternating current motor provided with two armature circuits, one of which is an inductive circuit continually closed upon itself, and the other of which is connected with the source of supply through a redirecting commutator which produces constant polarization of the armature core at synchronous speed, whereby the latter will fall into operation when the motor approaches or attains synchronism.

2. In an alternating current motor the combination with a magnetic core wound to develop a rotary magnetic field, and an armature provided with two windings, one having a circuit inductively acted upon by the rotary field, and the other a synchronous circuit supplied through a redirecting commutator.

3. A combined self-starting and synchronous alternating current motor provided with two windings, one comprising an element wound to develop a rotary magnetic field under differential phase currents cooperating with a closed circuit upon the other element, the other comprising a synchronous winding including a redirecting commutator which produces constant polarization of the armature core at synchronous speed, and a switch for closing the latter circuit when the motor is at or above synchronous speed.

4. An alternating current motor comprising a magnetic core wound to develop a rotary magnetic field, when coupled in a circuit of differential phase currents, a switch for making such field multipolar in character, and a multipolar armature provided with two windings, one closed upon itself and the other controlled by a switch, and provided with a redirecting commutator, whereby the motor is rendered self-starting and when it attains synchronous speed it may be operated as a synchronous motor.

5. An alternating current motor comprising a magnetic core wound to develop a rotary magnetic field when coupled in a circuit of differential phase currents, a switch for varying the number of poles in such field, and an armature provided with two windings, one of which is closed upon itself and the other connected through a redirecting commutator with a switch connecting with an alternating current supply circuit.

6. A combined self-starting and synchronous alternating current motor comprising a magnetic core wound to develop a rotary magnetic field when coupled with a differential phase alternating current circuit, and an armature provided with two windings, one closed upon itself and the other wound to develop constant poles equal in number to those of the rotary field, and means for connecting the latter with a suitable source of current to polarize it when at or above synchronism.

In testimony whereof I affix my signature in presence of two witnesses.

CHARLES S. BRADLEY.

Witnesses:
A. L. SEARLES,
F. S. HUNTING.